United States Patent [19]

Vermilion et al.

[11] Patent Number: 5,601,897
[45] Date of Patent: Feb. 11, 1997

[54] VACUUM INSULATION PANEL HAVING CARBONIZED ASPHALT COATED GLASS FIBER FILLER

[75] Inventors: Donn R. Vermilion, Newark; Carl R. Strauss, Granville; Herbert L. Hall, Jr., Newark; Frederick H. Ponn, Granville, all of Ohio

[73] Assignee: Owens-Corning Fiberglass Technology Inc., Summit, Ill.

[21] Appl. No.: 486,479

[22] Filed: Jun. 7, 1995

Related U.S. Application Data

[63] Continuation-in-part of Ser. No. 325,087, Oct. 17, 1994, abandoned.

[51] Int. Cl.⁶ ........................................... B32B 1/06
[52] U.S. Cl. ..................... 428/69; 428/74; 428/75; 428/76; 428/219; 428/220
[58] Field of Search ......................... 428/69, 74, 75, 428/76, 219, 220, 273, 274, 303

[56] References Cited

U.S. PATENT DOCUMENTS

| | | |
|---|---|---|
| 3,179,546 | 4/1965 | Strong et al. . |
| 4,359,496 | 11/1982 | Kratel et al. . |
| 4,444,821 | 4/1984 | Young et al. . |
| 4,463,043 | 7/1984 | Reeves et al. . |
| 4,486,482 | 12/1984 | Kobayashi et al. . |
| 4,669,632 | 6/1987 | Kawasaki et al. . |
| 4,726,974 | 2/1988 | Nowbiliski et al. . |
| 5,090,981 | 2/1992 | Rusek, Jr. . |
| 5,094,899 | 3/1992 | Rusek, Jr. . |
| 5,275,875 | 1/1994 | Suh et al. ................... 428/292 |
| 5,330,816 | 7/1994 | Rusek, Jr. . |

*Primary Examiner*—Patrick Ryan
*Assistant Examiner*—Richard C. Weisberger

[57] ABSTRACT

Vacuum insulation panels include an insulating media made up of glass fibers having a carbonized asphalt coating thereon. When such carbon-coated glass fibers are used as fillers for metal jacketed vacuum insulation panels, the resulting panels can be used for substantially higher temperature applications. The carbon on the carbon-coated fibers can be activated to absorb any outgassing that occurs from the insulation media within the panels to help ensure satisfactory vacuum levels over time.

10 Claims, 1 Drawing Sheet

# 5,601,897

VACUUM INSULATION PANEL HAVING CARBONIZED ASPHALT COATED GLASS FIBER FILLER

The instant application is a continuation in part application of copending application Ser. No. 08/325,087, filed Oct. 17, 1994 and entitled CARBONIZED ASPHALT COATING FOR GLASS FIBERS now abandoned.

BACKGROUND OF THE INVENTION

The present invention relates in general to insulating panels and, more particularly, to improved vacuum insulation panels having carbonized asphalt coated glass fiber fillers for use in high temperature applications and methods of making such panels.

Vacuum insulation panels are well known in the art and typically consist of a thermally insulating media which is contained within a sealed enclosure. The enclosure is evacuated to created a vacuum in the enclosure and thereby reduce heat transfer through the panel.

Conventional silica powder or glass fiber filled vacuum insulation panels are generally restricted to service temperatures below approximately 400° C. Unfortunately, many applications including, for example, ovens, furnaces, and gas and diesel engine catalytic exhaust systems, require insulations which can withstand temperatures as high as approximately 1000° C. These high temperature applications could also benefit from the high performance thermal insulating characteristics of vacuum insulating panels.

Above 400 DEG C., degradation of either or both the jacket member or filler material occurs over time. Most silica powder vacuum insulation panels experiences degradation of the polymer jacketing film above 90 DEG C. in applications which require a service life of several years. Even those applications which utilize high performance polymer compounds laminated with metal foils experience rapid loss of vacuum integrity above 315 DEG C. due to an increase in the jacket's permeability and outgassing properties.

Conventional silica glasses above 400 DEG C., whether in powder or fiber form, begin to deform when compressively loaded. This results in an increase, over time, in the contact area between adjacent fibers or powder particles, and, an increase in the filler material's density with a concomitant loss in the filler material's insulating performance.

While alternate filler materials, such as ceramic fibers and powders, can provide an extended temperature operating range, these materials have inherent disadvantages including high cost, poor infrared radiation blocking properties, health hazard concerns and difficulty in recycling. Carbon may be added in powder form to refractory based insulation in order to improve its radiation blocking properties. However, due to carbon's relatively high thermal conductivity, particularly in powder form at high loadings encountered for example in vacuum insulation panels, additions of carbon powder are of minimal benefit.

Accordingly, there is a need for improvements in vacuum insulation panels to adapt such panels for higher temperature applications.

SUMMARY OF THE INVENTION

This need is met by the method and apparatus of the present invention wherein vacuum insulation panels include an insulating media made up of glass fibers having a carbonized asphalt coating thereon. When such carbon-coated glass fibers are used as fillers for vacuum insulation panels, the resulting panels can be used in high temperature applications and retain the desirable attributes of panels having conventional glass fiber fillers. That is, the panels are easy to manufacture, exhibit good thermal insulating performance, are made from abundant, readily available materials, are environmentally safe, have low outgassing potential, are readily recyclable, and are moldable to a variety of shapes. In addition, the carbon on carbon-coated fibers can be activated to absorb any outgassing that occurs from the insulation media to help ensure satisfactory vacuum levels within the panels over time.

In accordance with one aspect of the present invention, a vacuum insulation panel comprises a sealed evacuated metal jacket defining an interior space, and an insulating media in the interior space comprising glass fibers having a carbonized asphalt coating thereon.

In accordance with another aspect of the present invention, a method of making a vacuum insulation panel comprises the steps of: forming a jacket of a metal having a low coefficient of thermal conductivity defining an interior space and an opening communicating with the interior space; filling the interior space with an insulating media made up of fibers having a carbonized asphalt coating thereon; evacuating the interior space to form a vacuum therein; and, sealing the opening while maintaining the vacuum. The carbon on the fibers can be activated to serve as a getter within the vacuum insulation panel. Preferably, the glass fibers contain from 1.0% to 40.0% by weight of carbonized asphalt based on the total weight of the carbonized asphalt and glass fibers.

Panel construction for service temperatures up to 600° may use 304L stainless steel foil as the jacketing member due to its oxidation resistance. However, for applications between 600° and 1000°, both the media and jacket material should be further upgraded. In addition to a carbon-coating, the glass composition may be modified by increasing the silica content. The preferred jacketing material for service at these higher temperatures is Inconel 601. It exhibits a lower propensity for outgassing due to its high nickel content.

It is, thus, an object of the present invention to provide an improved vacuum insulation panel and an improved method for making the panel; to provide an improved vacuum insulation panel and an improved method for making the panel by using an insulating media composed of carbon-coated glass fibers in the panel; and, to provide an improved vacuum insulation panel and an improved method for making the panel by using an insulating media composed of glass fibers coated with activated carbon in the panel.

Other objects and advantages of the invention will be apparent from the following description, the accompanying drawings and the appended claims.

DETAILED DESCRIPTION OF THE INVENTION

Figure 1:
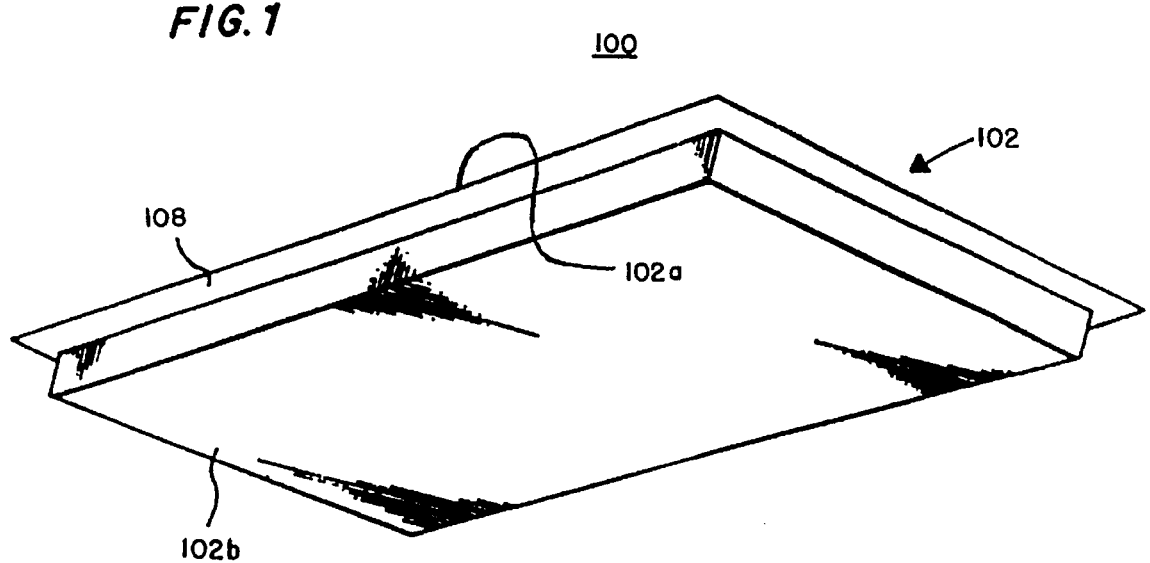
FIG. 1 is a perspective view of a vacuum insulation panel in accordance with the present invention.
Figure 2:
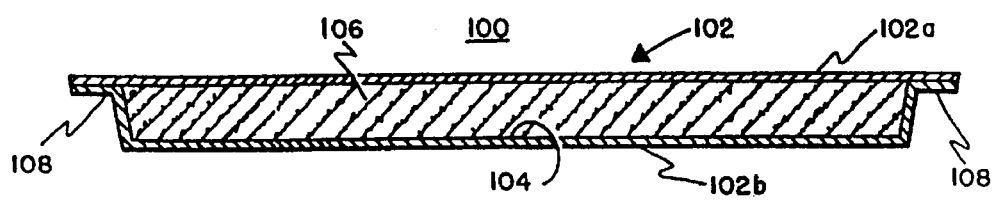
FIG. 2 is a schematic cross sectional view of the vacuum insulation panel of FIG. 1.

With reference to FIGS. 1 and 2, a vacuum insulation panel 100 in accordance with the present invention comprises a jacket 102 including a top 102a and a bottom 102b.

The jacket 102 is formed of a metal preferably having a low coefficient of thermal conductivity and low gas permeability, for example 3 mil stainless steel. Of course, other metals can be used in the present invention.

As illustrated, the bottom 102b is formed into a pan shape having a cavity 104 for receiving an insulating media 106 and a flat flange 108 extending around its periphery. It is important that the flange 108 be flat, unthinned and wrinkle free to permit a hermetic seal with the top 102a. The top 102a, which is illustrated as being flat but also may be pan shaped or otherwise configured, is welded to the flange 108 to create a hermetic seal either using laser welding or a roll resistance seam welding process.

A number of other vacuum insulation panel structures and methods of making those panels are known in the art and also can be used in the present invention. Additional information regarding vacuum insulation panel structures and their manufacture can be obtained by reviewing U.S. Pat. No. 5,330,816 and U.S. Patent application Ser. No. 08/217, 163 which was filed on Jul. 7, 1994, and is entitled VACUUM INSULATION PANEL AND METHOD FOR MANUFACTURING both of which are assigned to the same assignee as the present application and are incorporated herein by reference.

In accordance with the illustrated embodiment of the present invention, the insulating media 106 comprises an insulating wool media made up of glass fibers coated with carbonized asphalt. The use of such carbon-coated glass fibers in vacuum insulation panels for high temperature applications overcomes problems encountered with current glass fiber based vacuum insulation panels used for such applications. For example, glass fibers in current vacuum insulation panels suffer a loss of modulus of elasticity over time when used at elevated temperatures greater than 450° C.

Due to the atmospheric pressure of approximately 15 pounds per square inch (PSI) which acts over the entire surface of the panels, this relaxation of glass fibers results in a gradual collapse of the filler or spacer media of the panels and a resultant decrease in thermal insulating performance. The reduced insulating performance has been attributed to an increase in the fiber-to-fiber contact angle and a decrease in the effective thermal path through the spacer media since more fibers are brought into contact with adjacent fibers.

The carbon-coated glass fibers, as will be described hereinafter, provide structural stiffening to the underlying glass fibers by means of a tightly adhered layer of carbon which can not be easily abraded from the surface of the glass fibers. As glass fiber shrinkage occurs at carbonizing temperatures, the two dimensional carbon layer is also densified and tightly bonded to the glass. Microscopic evaluation shows carbon bonds or bridges at fiber-to-fiber crossover points which impart a three dimensional structure to the spacer media. It is believed that use of the vacuum insulation panels of the present invention at high temperatures will cause the carbon-carbon bonds to be more fully developed thereby increasing the strength of the carbon-coated glass fibers over time.

By coating the glass fibers with carbon rather than adding carbon powder, the density of the media is reduced. This reduction in density is achieved in two ways: first, random fiber-to-fiber bridges of carbon; and, second, increased modulus of elasticity of the fibers. The network of carbon bridges and the improved modulus of elasticity prevents excessive collapse of the fibers onto one another thereby ensuring a long thermal path for the solid conduction component of heat transfer through the interior of the spacer media.

In addition to a reduction in density, thinner vacuum insulation panels are possible in accordance with the present invention. It is believed that thin vacuum insulation panels, less than 0.5 inches in thickness, begin to conduct a larger percentage of the total heat flow through the panels due to inadequate infrared blocking capability of the thin spacer media, i.e., the ability to block the radiation component of heat transfer. Vacuum insulation panels with carbon-coated glass fiber filler media have improved radiation blocking properties relative to thicker panels with plain glass fiber filler media.

Another feature of using carbon-coated glass fiber filler media for vacuum insulation panels is the scavenging property of activated carbon. Since a minimum level of vacuum must be maintained within vacuum insulation panels over their effective lifetimes, getters, i.e., absorbers of gaseous elements and compounds, are routinely added to the panels prior to final vacuum seal-off. The getters help ensure satisfactory vacuum level over time by absorbing any outgassing that occurs from the insulation media within the panels. Thus, depending upon the jacket material selected and the service temperature, additional getters may not be required when activated carbon-coated glass fiber is used resulting in a cost saving to the manufacturer.

A preferred form of carbon-coated glass fibers will now be described followed by a description of activated carbon-coated glass fibers. Asphalt is applied in the form of an aqueous emulsion using equipment that has been employed in the past to directly spray a binder onto a downwardly flowing stream of glass fibers. These fibers are then collected, as in the past, in the form of a blanket on a conveyor, and are heated at a temperature and for a time sufficient to remove water. Thus, glass fibers are coated with asphalt in much the same way the conventional glass fibers are sized. These fibers also are partially dried.

The term asphalt means asphalts which are free of rubber and are non-chemically modified. That is, they are conventional asphalts, not asphalts which have been combined with rubber or reacted with asphalt reactive materials. Preferably, the asphalts for use herein are the air blown asphalts, as well as asphalt flux or paving grade asphalts known as asphalt cements. Representative asphalts are AC-20, AC-10 and AC-5. Such asphalts are most desirably applied as an aqueous emulsion and the emulsion may be produced by techniques well known in the art. More conveniently, however, any of the numerous commercially available emulsions will be employed. Such emulsions are exemplified by those commercially available from the Koppers Chemical Company under their designation CRS-1 emulsion and from Byerlite under their designation K-1-C emulsion. The emulsions employed in the practice of this invention may be either anionic, cationic or nonionic. As will be readily apparent, such emulsions will include the dispersed asphalt, water and an appropriate emulsifying agent. For continuous yarn processing, a glass lubricant will be added to these emulsions. One such suitable lubricant is an acetic acid stabilized reaction product of tetraethylene pentamine and stearic acid. Other suitable lubricants include sulfonated mineral oils, polyoxyethylene stearates and oleates, sorbitan oleates and stearates, as well as isostearates.

Suitably, the emulsions which are applied will contain about 20% to about 98.5% (by weight) water. For insulation uses, the asphalt content of the emulsion will be about 1% to about 40.0%. For continuous yarns, the emulsion is 30.0% to 65.0% asphalt. The remainder of the asphalt emulsion will include an emulsifying agent, for example, a cationic, anionic or nonionic surfactant present in an amount sufficient to emulsify the asphalt and preferably a lubricant. The lubricant will desirably be present in an amount of about 0.05% to about 1.0% (based on the weight of emulsion). Generally, the non-aqueous portion of the emulsion will contain about 1% to about 10% of the above-described materials. Usually the emulsion will be applied in sufficient amounts so that the final product will contain about 1.0% to about 50.0% by weight of the carbonized asphalt (based on the total weight of asphalt and glass). Preferably, the weight percent of carbonized asphalt ranges from 10.0% to 40.0% by weight for insulation uses and 5.0% to 30.0% by weight for continuous rovings.

After application of the asphalt emulsion to the stream of fibers, the fibers are collected as a blanket on a conveyor or wound into a reinforcement package of continuous strands. The asphalt coating is then carbonized by heating the glass fibers in an inert atmosphere. The carbonizing temperature generally ranges from 600° C. to 2200° C. and preferably ranges from 600° C. to 1100° C. The inert atmosphere may be any inert gas such as helium, neon or argon with argon being preferred.

The early heating or drying is carried out in a conventional air atmosphere at relatively low temperatures of generally 200° C. to 400° C. to produce an infused asphalt coating on the glass fibers. These fibers then are heated up to carbonizing temperatures at a heat-up rate of 10° C. to 100° C. per minute in an atmosphere of an inert gas according to a customary method to carbonize the infusibilized fiber. Samples of glass fiber wool insulation were prepared as follows.

EXAMPLE I

A wool sample was coated with asphalt using a flood and extract method. The asphalt was dried and cured into a one inch thick specimen. The density was measured at 4.4 pcf with an LOI (loss on ignition) of 21.8%. The sample was treated as follows. The starting material was heated under an argon atmosphere at the rate of 10° C. per minute to 600° C. It was cooled and removed. The sample was black and retained its original dimensions. The fibers were still intact and could be pulled from the sample.

EXAMPLE II

Part of the material from Example 1 step one was returned to the oven and reheated under argon at 10° C. per minute to 700° C. and held there for one hour. The sample was somewhat blacker than the material from 600° C., but was essentially the same in all other respects. An uncoated sample of glass fiber insulation heated to 700° C. in the atmosphere melted to a glass ball. The carbonized structure appears to have stabilized the glass fiber.

EXAMPLE III

Another asphalt/glass fiber sample weighing 3.30 grams was heated under argon at 10° C. per minute to 600° C. and held there one hour. Heating was then continued at 10° C. per minute to 700° C. and held there one hour. Finally, heating was continued at 10° C. per minute to 800° C. and held there one hour. Finally, heating was continued at 10° C. per minute to 900° C. and held there one hour. The final product weight was 2.85 grams, leaving a coating weight of 8.2%. The material produced retained the appearance of the starting material. The fibers were intact and retained their shape. The coating was clearly carbonized.

EXAMPLE IV

Wet process mats were prepared as input for a laminate for tensile testing. The mats were dipped in asphalt emulsion and carbonized. Test data was obtained by asphalt coating a sample of the wet process mat produced from the glass fiber wool to about 28% asphalt. This material was then carbonized at 700° C. as in Example II. The samples were tested using the mats as reinforcement for epoxy laminates. The results were:

|  | Stress (kpsi) | Modulus (mpsi) | Strain (%) |
| --- | --- | --- | --- |
| mat-(no asphalt) | 7.2 | 0.69 | 1.20 |
| mat-conventional asphalt coated | 4.5 | 0.44 | 1.19 |
| mat-asphalt coated carbonized to 700° C. | .42 | 0.63 | 0.84 |

The carbonization process resulted in performance essentially the same as no asphalt. The lower stress of the asphalt and carbonized samples may be adhesion related. The glass fibers used were not sized. Sizing first should correct the adhesion problem. The modulus of the carbonized sample is increased over the conventional asphalt coated sample, but is not higher than control.

The carbonized fibers can be "activated" through oxidation (gasification) of a part of the carbon and the resulting formation of a highly porous structure. The activation process involves thermal activation of the carbonized material using an oxidizing gas such as oxygen, $CO_2$ or water vapor. In all cases the reaction involves the oxidation of carbon to CO or $CO_2$. The reaction with water vapor proceeds at around 700° C., while $CO_2$ requires approximately 900° C. Somewhat higher or lower temperatures can be used (±200° C., preferably ±100° C.) with the predicted influence on reaction rate. The preferred method is to use $CO_2$ or water vapor as they are easier to control. The most preferred method is to use $CO_2$ as it is easiest to control However, water vapor has the lower temperature of activation, 700° C., and will not deteriorate the glass strength to the extent 900° C. will.

The activation step is conveniently started by changing the atmosphere surrounding the glass fibers from the inert atmosphere used during carbonization to an atmosphere containing some oxidizing gas. For example, the glass fibers can be carbonized in an atmosphere of argon, and then to start the activation process carbon dioxide can be introduced into the atmosphere. In a preferred process, the ratio of $CO_2$ to argon used is about $25/75$ ($CO_2$/argon) by weight. The amount of oxidizing gas in the atmosphere can be increased up to 100% by weight to increase the rate of pore formation during the activation step, or decreased down to about 5% by weight to increase control of the activation process. Preferably the atmosphere contains from about 10% to about 40% by weight oxidizing gas and from about 60% to about 90% by weight inert gas.

The extent of activation depends on the amount of oxidizing gas, the temperature, and the duration of exposure to the hot oxidizing gas; as activation continues, the pores are enlarged and the weight of the remaining carbon decreases. This is reflected in increasing specific surface area (in square meters per gram of carbon) as measured by the well-known "B.E.T." method using nitrogen as a probe. Too much activation would oxidize too much carbon to a gas, while too little activation would create insufficient pores for effective gettering. Accordingly, the activation process is carried out until the surface area of the coated fibers ranges between about 50 $m^2/g$ carbon and about 2000 $m^2/g$ carbon, preferably between about 200 $m^2/g$ carbon and about 1000 $m^2/g$ carbon, and more preferably between about 400 $m^2/g$ carbon and about 1000 $m^2/g$ carbon. Typical activation times are between about 10 minutes and about 5 hours, and depend on the particular process and materials.

After the carbon on the fibers has been activated to the desired extent, the activation process is ended by cooling the fibers. Preferably the fibers are cooled to below about 200° C. in an inert atmosphere.

EXAMPLE V

Samples of glass fiber wool were coated with an asphalt emulsion using a flood and extract method. The glass fiber wool contained rotary bicomponent fibers having an average diameter of about 5 microns. The emulsion contained about 36% asphalt, about 62% water, and about 2% Indulan Sal emulsifier. The asphalt coated samples were heated at a rate of 10° C. per minute under a blanket of argon. Once the samples were at 900° C., the blanket gas was changed to a mixture of 25% carbon dioxide/75% argon by weight. The samples were held at 900° C. for various lengths of time to produce surface active sites. The surface areas of the samples were measured by the B.E.T. method. The results are tabulated below.

| Sample | Gas | Heating Time | LOI | Surface Area |
| --- | --- | --- | --- | --- |
| 1 | Argon | 60 min. | 6.3% | 4.81 $m^2/g.C$ |
| 2 | Ar/$CO_2$ | 5 min. | 10.2% | 3.12 $m^2/g.C$ |
| 3 | Ar/$CO_2$ | 25 min. | 7.7% | 256 $m^2/g.C$ |
| 4 | Ar/$CO_2$ | 60 min. | 8.2% | 695 $m^2/g.C$ |

Samples 3 and 4 had a high surface area of activated carbon and had excellent gettering properties, comparing favorably with activated carbon. Further increases in surface area should be possible by increasing LOI and reaction time at 900° C.

Having thus described the invention of the present application in detail and by reference to preferred embodiments thereof, it will be apparent that modifications and variations are possible without departing from the scope of the invention as defined in the appended claims.

We claim:

1. A vacuum insulation panel comprising:
   a sealed evacuated metal jacket defining an interior space; and
   an insulating media in said interior space comprising glass fibers having a carbonized asphalt coating thereon.

2. A vacuum insulation panel as claimed in claim 1 wherein said carbonized asphalt coating on said glass fibers is activated.

3. A vacuum insulation panel as claimed in claim 1 wherein said glass fibers contain from 1.0% to 40.0% by weight of carbonized asphalt based on the total weight of the carbonized asphalt and glass fibers.

4. A vacuum insulation panel as claimed in claim 1, wherein said metal jacket is formed from stainless steel.

5. A vacuum insulation panel as claimed in claim 4, wherein said metal jacket has a thickness of about 3 mil.

6. A vacuum insulation panel as claimed in claim 1, wherein said glass fibers having a carbonized asphalt coating thereon are prepared by a process comprising: spraying an asphalt emulsion onto a stream of glass fibers to form a coating, said asphalt emulsion comprising asphalt, water, and an emulsifying agent; and carbonizing the coating at a temperature of from 600° C. to 2200° C. in an inert atmosphere.

7. A vacuum insulation panel as claimed in claim 6, wherein said asphalt is an air blown asphalt, asphalt flux, or paving grade asphalt.

8. A vacuum insulation panel as claimed in claim 2, wherein said glass fibers having a carbonized asphalt coating that is activated thereon are prepared by a process comprising:
   spraying an asphalt emulsion onto a stream of glass fibers to form a coating, said asphalt emulsion comprising asphalt, water, and an emulsifying agent; carbonizing the coating at a temperature of from 600° C. to 2200° C. in an inert atmosphere; and thermally activating the coating using an oxidizing gas.

9. A vacuum insulation panel as claimed in claim 8, wherein said asphalt is an air blown asphalt, asphalt flux, or paving grade asphalt.

10. A vacuum insulation panel as claimed in claim 2, wherein the coated glass fibers have a surface area of between about 50 $m^2/g$ activated carbon and about 2000 $m^2/g$ activated carbon.

\* \* \* \* \*